United States Patent [19]

Roehrig et al.

[11] Patent Number: 5,698,255

[45] Date of Patent: Dec. 16, 1997

US005698255A

[54] REDUCED FAT MEAT

[75] Inventors: Paul G. Roehrig, New Glarus; Henry J. Overkamp; Paul G. Morin, both of Madison, all of Wis.

[73] Assignee: Kraft Foods, Inc., Northfield, Ill.

[21] Appl. No.: 801,241

[22] Filed: Feb. 18, 1997

Related U.S. Application Data

[63] Continuation of Ser. No. 570,831, Dec. 12, 1995, abandoned, which is a continuation of Ser. No. 299,228, Aug. 31, 1994, abandoned, which is a division of Ser. No. 130,347, Oct. 1, 1993, Pat. No. 5,382,444, which is a continuation of Ser. No. 838,121, Feb. 19, 1992, abandoned.

[51] Int. Cl.$^6$ ............................ A23L 1/31; A23L 1/317
[52] U.S. Cl. ............................................ 426/646; 426/641
[58] Field of Search .................................. 426/417, 646, 426/641; 554/8, 23, 175

[56] References Cited

U.S. PATENT DOCUMENTS

| | | | |
|---|---|---|---|
| 2,745,856 | 4/1956 | Dayen et al. | 554/8 |
| 2,911,421 | 11/1959 | Greenfield | 554/8 |
| 3,008,831 | 11/1961 | Christianson . | |
| 3,013,887 | 12/1961 | Eolkin . | |
| 3,063,840 | 7/1962 | Sullivan . | |
| 3,078,287 | 2/1963 | Downing | 426/417 |
| 3,141,774 | 7/1964 | Little | 426/417 |
| 3,177,080 | 4/1965 | Alberts . | |
| 3,270,041 | 8/1966 | Artar et al. | 554/8 |
| 3,295,982 | 1/1967 | Hickey et al. . | |
| 3,352,841 | 11/1967 | Lyon . | |
| 3,449,315 | 6/1969 | Aikins . | |
| 3,539,549 | 11/1970 | Greenfield . | |
| 3,780,075 | 12/1973 | Dufault et al. . | |
| 3,780,191 | 12/1973 | Langer et al. | 426/231 |
| 3,938,072 | 2/1976 | Baird et al. . | |
| 4,137,335 | 1/1979 | Holm et al. | 426/417 |
| 4,163,009 | 7/1979 | Filstrup . | |
| 4,168,418 | 9/1979 | Bird . | |
| 4,201,302 | 5/1980 | Roth | 209/577 |
| 4,216,239 | 8/1980 | Gloppestad | 426/456 |
| 4,335,146 | 6/1982 | Bladh | 426/231 |
| 4,335,846 | 6/1982 | Shapiro . | |
| 4,344,976 | 8/1982 | Bladh | 426/272 |
| 4,504,515 | 3/1985 | Hohenester et al. | 426/641 |
| 4,567,050 | 1/1986 | Roth | 426/417 |
| 4,619,789 | 10/1986 | Strop et al. . | |
| 4,680,183 | 7/1987 | Van Schouwenberg | 426/64 |
| 4,747,342 | 5/1988 | Schack et al. | 99/472 |
| 4,764,163 | 8/1988 | Caldwell | 494/56 |
| 4,778,682 | 10/1988 | Chapman | 426/248 |
| 4,844,922 | 7/1989 | Uemura et al. | 426/104 |
| 4,847,009 | 7/1989 | Elinsky | 426/233 |
| 4,876,103 | 10/1989 | Kawane et al. | 426/574 |
| 4,966,733 | 10/1990 | Fernando et al. . | |
| 4,980,185 | 12/1990 | Small | 426/417 |
| 5,026,565 | 6/1991 | McLachlan et al. | 426/241 |
| 5,092,528 | 3/1992 | Rudibaugh | 241/65 |
| 5,167,977 | 12/1992 | Gamay | 426/417 |
| 5,221,554 | 6/1993 | Gamay | 426/646 |
| 5,286,514 | 2/1994 | Webb et al. | 426/646 |
| 5,368,878 | 11/1994 | Smick et al. | 426/646 |

FOREIGN PATENT DOCUMENTS

| | | |
|---|---|---|
| 463736 | 3/1950 | Canada . |
| 948651 | 2/1964 | United Kingdom . |
| 974154 | 11/1964 | United Kingdom . |
| 1046642 | 10/1966 | United Kingdom . |
| 2244999 | 12/1991 | United Kingdom . |
| WO9108680 | 6/1991 | WIPO . |

OTHER PUBLICATIONS

Wimmer et al, "Washed Mechanically Separated Pork As a Surimi–like Meat–product ingredient", Journal of Food Science, vol. 58, No. 2 (1993), pp. 254–258.

"A Continuous Wet Rendering Process for Processing Soft Fatty Tissues", Alfa–Laval, undated, 2 pages.

Article entitled "The Trim–R Process—The Development of Continuous Low Low Temperature Rendering" (Circas 1950's).

P.L. Dawson, B.W. Sheldon, and H.R. Ball, Jr., "Extraction of Lipid and Pigment Components from Mechanically Deboned Chicken Meat", vol. 53, No. 6, 1988, Journal of Food Science, pp. 1615–1617.

G.W. Froning and Faye Johnson, "Improving the Quality of Mechanically Deboned Fowl Meat by Centrifugation", vol. 38, 1973, Journal of Food Science, pp. 279–281.

Froning and Johnson, Improving the Quality of Mechanically Deboned Fowl Meat by Centrifugation, 38 Journal of Food Science, 270–272.

New Technology Yields Low–Fat Meat Ingredients, FEM, undated.

*Primary Examiner*—Arthur L. Corbin
*Attorney, Agent, or Firm*—Lockwood, Alex, Fitzgibbon & Cummings

[57] ABSTRACT

Sources of meat having a high fat content, such as meat trimmings, are processed in a manner by which meat products prepared therefrom have a dramatically reduced fat content while retaining the desirable functionality of the unprocessed meat sources. The fat-containing meat trimmings or the like are comminuted, heated and centrifuged under specific processing conditions in order to provide unformulated raw reduced fat meat having a fat content of not greater than on the order of about ten percent by weight while having excellent functionality. The unformulated reduced fat meat is formable into a variety of familiar meat products, including wieners, sausages, hamburger patties, and the like, thereby providing products having taste, appearance, texture and other qualities which are substantially indistinguishable from products prepared from high fat unformulated raw materials but which have dramatically reduced fat contents.

33 Claims, 2 Drawing Sheets

REDUCED FAT MEAT

RELATED APPLICATIONS

This application is a continuation of application Ser. No. 570,831, filed Dec. 12, 1995, now abandoned, which was a continuation of application Ser. No. 299,228, filed Aug. 31, 1994, now abandoned, which was a division of application Ser. No. 130,347, filed Oct. 1, 1993, now U.S. Pat. Nos. 5,382,444, 130,347, filed Oct. 1, 1993, now U.S. Pat. No. 5,382,444, which was a continuation of application Ser. No. 838,121, filed Feb. 19, 1992, now abandoned.

BACKGROUND OF THE INVENTION

1. Field of the Invention

The present invention generally relates to processing of raw meat into a reduced fat meat having excellent functionality. More particularly, the invention provides fat-reduced uncooked meat from raw meat materials that traditionally are so high in fat content as to be unsuitable for use as a portion of raw meat which is heated to prepare a low-fat cooked meat product or as the meat ingredient of a low-fat meat-containing food product. Typical raw meat materials in this regard have fat contents of as high as about sixty percent by weight or above and usually no lower than about twenty weight percent. In accordance with the invention, this fat-containing raw meat material is processed into raw meat material which is highly functional and which has an exceptionally low fat content, not greater than ten percent and typically on the order of five percent by weight or lower. This provides a versatile low-fat raw meat material which is suitable for use as a finished product and which has the ability to be molded, extruded, and/or stuffed into a shape to provide finished food products and/or blended with non-meat ingredients in order to thereby prepare finished food products of which meat is a primary component.

2. Description of the Related Art

The level of fat included in diets is of concern in many channels, particularly with respect to meat products or foods that contain animal-originating meat components. Meat food products are available which fall into the generally low fat category. Often, it is considered satisfactory if the fat content of an uncooked raw meat supply is within a general magnitude on the order of about ten weight percent. While fat percentages of this general magnitude for raw meat materials represent a substantial step toward reducing the intake of fat for those who consume products made from this reduced-fat raw material, it would be beneficial to provide a highly functional fat-reduced meat raw material having a fat content of at least about one half of this magnitude.

At times, raw meat materials having lowered fat contents are made available by procedures which include specially trimming raw meat cuts. These lower fat meat materials are relatively expensive and are not readily available in volumes which would be suitable for extended use in mass-produced foods. These specially trimmed raw materials typically, for example, include cuts of meat which are denuded or hand-trimmed and/or prepared by techniques which are highly labor intensive.

It is, of course, well-known that meats can be processed, either on a batch or a continuous basis, without requiring hand trimming. For example, U.S. Pat. No. 3,177,080 describes a typical procedure and apparatus for processing a high fat meat supply into one that is of reduced fat content. Often, these types of procedures include cooking, grinding and centrifuging as a basic approach for separating a fat-rich phase from another phase having a lower fat content. The phase having a lower fat content typically contains lean fractions which had become denatured during processing, and the functionality of this phase is reduced substantially, rendering it unsuitable for use in many applications. Also, approaches such as these do not provide a functional, reduced fat meat having a fat percentage well below ten percent such as one on the order of five percent and below.

SUMMARY OF THE INVENTION

Accordingly, there is a need for reduced fat meat, whether red meat or fowl, which has an exceptionally low fat content while at the same time including a protein fraction that is not denatured to any significant extent in order to thereby provide a highly functional meat product that is exceptionally low in fat content. It is especially desirable that a fat-reduced raw meat material be provided which will make possible the preparation of finished meat products or meat-containing products such as patties, sausages (including wieners and luncheon meats, whether stuffed in casings or made by molding or skinless processing procedures) and formed meat products such as chops, medallions, roasts, rolls, cups and the like. The successful commercial preparation of these types of products requires a raw meat component that retains its raw meat functionality especially insofar as it retains its ability to adhere to itself and be shaped as desired and to retain that shape until cooking, even during commercial food processing operations.

In summary, the present invention is a fat-reduced meat raw material prepared from meat supplies having a fat content of between about twenty weight percent and about sixty weight percent or above, based upon the total weight of the meat supply which also includes protein and moisture. This raw meat material is separated so as to provide the reduced fat meat raw material which has a fat content on the order of about five weight percent, based on the total weight of the reduced fat meat, depending somewhat upon whether fat-reduced pork, beef, turkey, chicken or the like are prepared. Furthermore, this fat-reduced meat retains the functionality of the raw material meat trimmings. In the preferred process for preparing the reduced fat meat, comminuted raw meat trimmings are heated to a temperature and under conditions at which fat present in the raw trimmings will liquify and its viscosity will be minimized, but protein denaturation will be substantially completely avoided. Thereafter, the meat trimmings are passed through a continuous-flow decanter centrifuge operating under conditions at which a generally liquid phase containing substantially all of the fat content of the meat trimmings is separated from a fat-reduced raw meat product having excellent functionality.

It is accordingly a general object of the present invention to provide a reduced fat meat from meat trimmings having a much higher fat content.

Another object of this invention is to provide an improved fat-reduced meat having superior functionality which is substantially the same as that of raw lean meat and is suitable for use as an unformulated raw meat material.

Another object of this invention is to provide fat-reduced meat products such as fat-reduced pork, beef, turkey, chicken and mutton by processing pork, beef, turkey, chicken or mutton trimmings according to a procedure by which a very substantial portion of the fat is removed from the supply of meat trimmings while avoiding any substantial detrimental effect on the functionality of the meat trimmings.

Another object of the present invention is to provide low fat meat raw materials on a continuous basis and by mechanized approaches which do not require hand trimming of fat from off of the raw material, which can itself be a high-fat product of meat trimming operations.

Another object of this invention is to utilize high-fat raw materials to make fat-reduced meat for use as finished products or in formulating with edible diluents into finished products.

Another object of the present invention is to provide highly functional low-fat meat products on a continuous-flow basis.

Another object of the present invention is to provide finished meat products made from reduced fat meat, which finished products have the taste and texture of finished products prepared from traditional raw ground meat such as ground beef.

Another object of this invention is to provide reduced fat meat having a ratio of water-holding capacity to protein percentage, or functionality, which is equal to or greater than 3 and preferably equal to or greater than 4.

Another object of this invention is to provide a reduced fat meat and a process of preparing same which increases the gross water-holding capacity of raw material from which reduced fat meat is prepared.

Another object of this invention is to prepare reduced fat meat by a process which carefully controls grinding conditions, feed temperature into and G-forces applied by a continuous decanter centrifuge through which the meat is passed.

These and other objects, features and advantages of the present invention will be clearly understood through a consideration of the following detailed description.

BRIEF DESCRIPTION OF THE DRAWINGS

In the course of this description, reference will be made to the attached drawings, wherein.

DESCRIPTION OF THE PREFERRED EMBODIMENTS

The fat-containing raw materials which are transformed into the reduced fat raw meat in accordance with the present invention typically are trimmings from meat processing operations. These trimmings, collected by cutting away visible fat from the muscle, are high in fat content. Examples of these trimmings, which are generally available in high volumes and at relatively low cost, include so-called 50 beef (containing roughly 50% "lean," which is the portion of the 50 beef that is not fat, typically lean plus moisture), 42 pork (approximately 58% fat and 42% lean), 72 pork (approximately 28% fat and 72% "lean"), mechanically deboned turkey (often between about 20 and 30% fat), and other sources of red meat, white meat or fowl trimmings having a fat percent generally on order of about 20 to about 60 weight percent. Often these raw materials are provided in ground form, a typical supply being ground to a particle size approximating one-eighth inch. Raw materials of this type are usually at a temperature on the order of 40° F.

Figure 1:
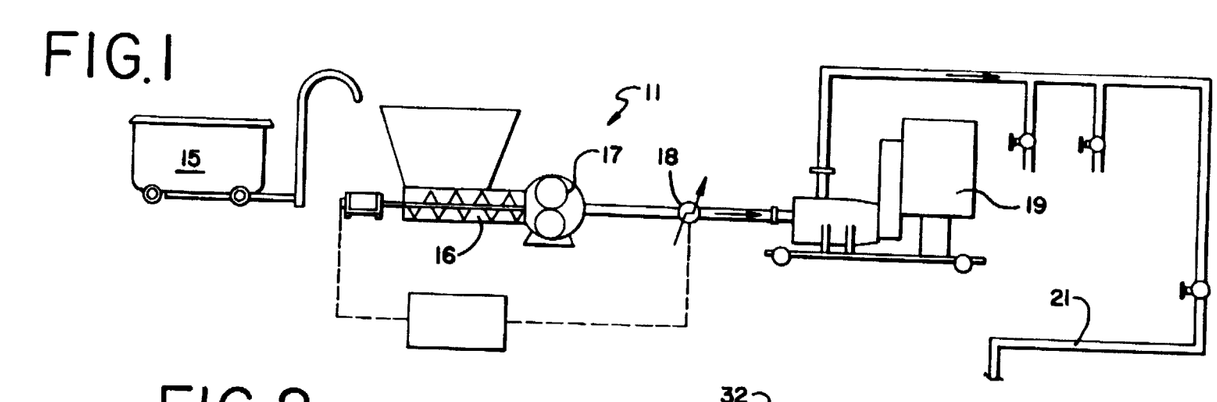
FIG. 1 is a generally schematic view of a particle size reduction arrangement whereby meat trimmings which are not in a comminuted state are reduced in particle size by being comminuted.
Figure 2:
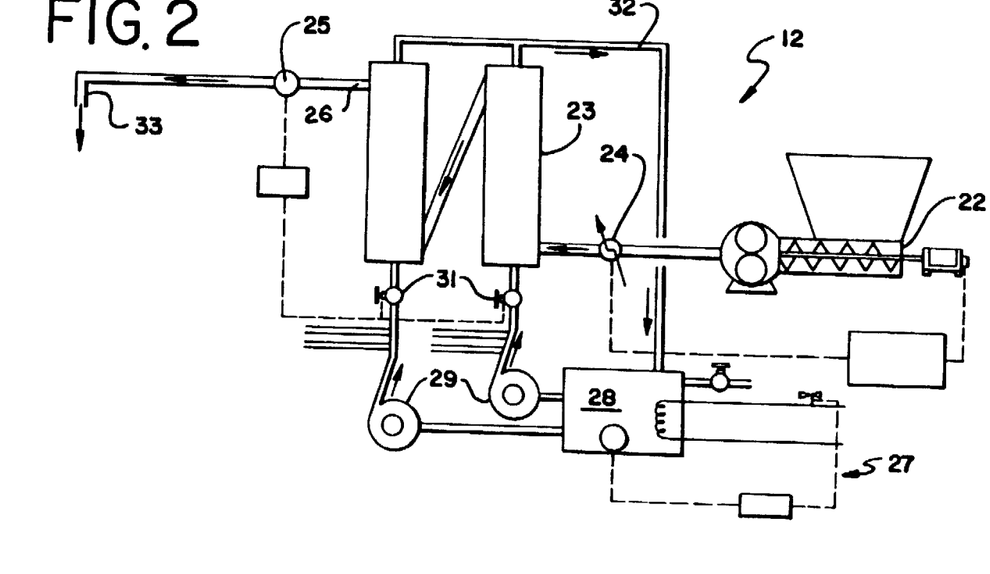
FIG. 2 is a generally schematic view of an arrangement for continuously, rapidly and evenly modifying the temperature of the comminuted meat.
Figure 3:
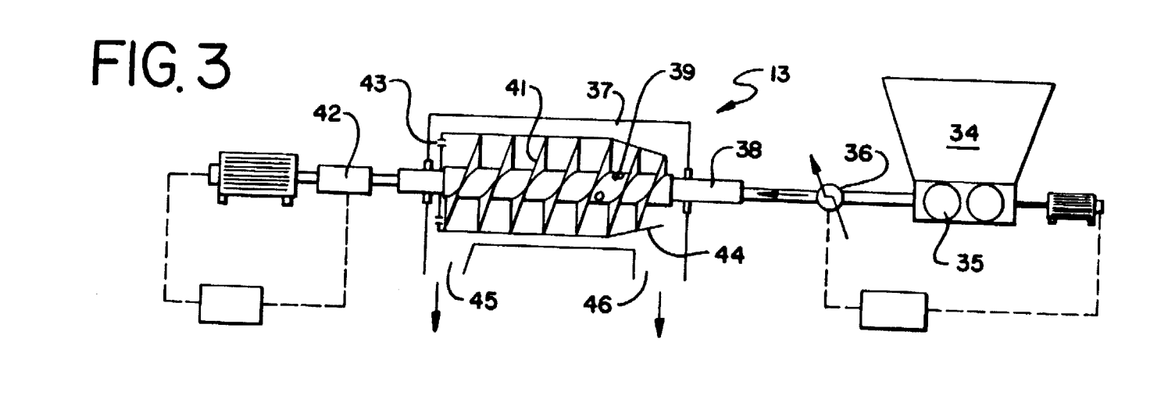
FIG. 3 is a generally schematic view illustrating passage of the warm, comminuted meat supply through a continuous decanter centrifuge.
Figure 4:
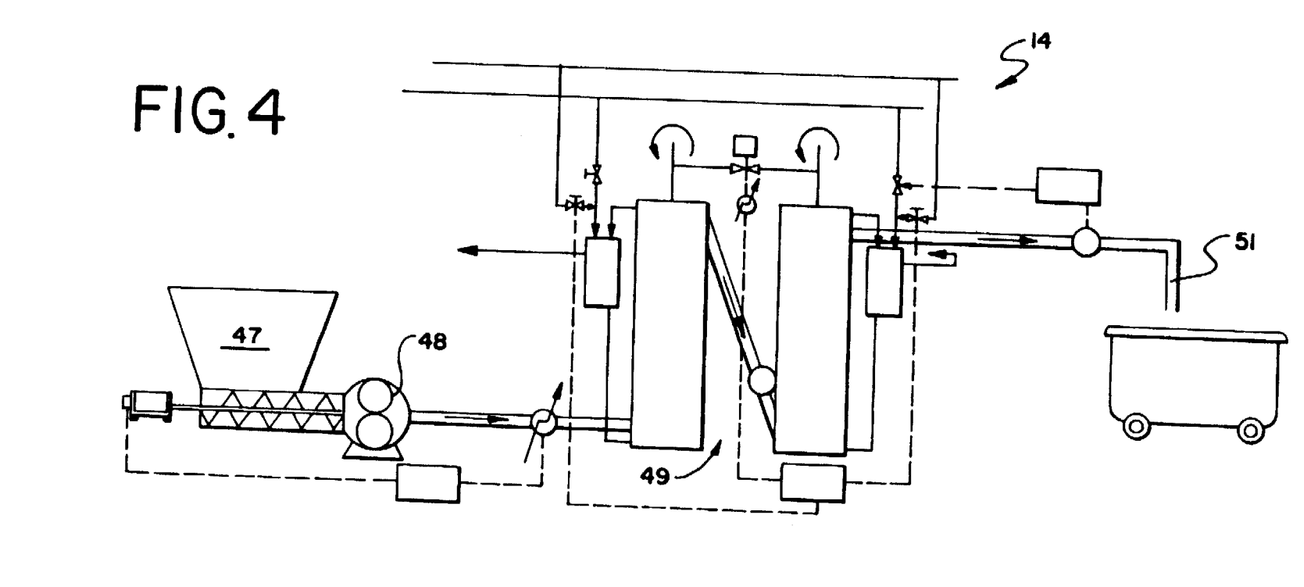
FIG. 4 is a generally schematic view illustrating an arrangement suitable for chilling the reduced fat meat flowing out of the continuous decanter centrifuge shown in FIG. 3.

The preferred apparatus illustrated in the drawings includes a particle size reduction station, generally designated as 11 in FIG. 1, a temperature adjustment station, generally designated as 12 in FIG. 2, a centrifugation station, generally designated as 13 in FIG. 3, and a chilling station, generally designated as 14 in FIG. 4. Although not shown in the drawings, it will be appreciated that these various stations are in communication with each other whereby meat material processed at an upstream station is passed to the receiving area of the next downstream station, as will be discussed in greater detail hereinafter.

Particle size reduction station 11 reduces the grind size of the fat-containing raw meat material to comminuted particle sizes. Some fat-containing raw materials such as mechanically deboned turkey are provided in a generally comminuted state, in which instance it is typically possible to avoid having to pass the high fat raw meat material through the particle size reduction station 11. Other meats having a high fat content will require comminution. In this regard, generally coarsely ground raw meat is supplied into a dumper 15 for passage into a transporting mechanism such as pump feeder 16 of generally known construction including members such as a positive displacement pump 17 and s flow meter 18. Meat is thereby fed into a comminution unit 19 in order to reduce the particle size of the ground meat to form a flow of comminuted meat.

A preferred comminution unit 19 is a Cozzini grinding device or emulsion mill wherein a plate having three protruding knives spins tightly against a plate having 4.5 mm holes therewithin. A rotating vane member pumps the comminuted meat through and out of the comminution unit and into a transfer conduit 21. These types of devices are high speed grinders, and the bladed plate is pressure fit against a foraminous plate. The meat raw material is fed through a two-inch pipe into the emulsion mill housing and engages the rotating blades to be severed to a size which passes through the holes in the plate. Feed pressure into the plate is typically between about 20 and 45 psi, depending in part upon how much meat raw materials being fed and how quickly it is being taken away from the grinder. Conduits in addition to transfer conduits 21 such as the two which are partially shown in FIG. 1 can also be provided whereby a single particle size reduction station 11 can supply a flow of comminuted meat to more than one temperature adjustment station 12.

With more particular reference to the comminution carried out at the particle size reduction station 11, the objective is to provide a very finely ground raw meat, although the grind is not to be excessively fine. Often, one can detect meat fibers in the comminuted material. Near emulsion grinds are accomplished. The grind is to be fine enough so that many cells of fat are broken, while avoiding the breakage of so many fat cells that a true emulsion is formed and the protein material again wraps around fat particles so as to interfere with separation of protein from fat. Typically, the particle size will be less than five sixty-fourths of an inch or about 2 mm, preferably less than or equal to 1 mm. In an especially preferred situation, the meat particles or muscle fiber pieces are approximately 0.1 to 0.6 mm in length and approximately 0.06 to 0.1 mm in diameter.

Excessive comminuting can be indicated by too great of a rise in the temperature of the raw meat when it passes through the particle size reduction station 11. For example, if the comminuting unit is operating under conditions such as a grinder speed which is too harsh for the flow rate through the comminuting unit, the particle size can be made too small and/or the temperature rise can be too great. It is believed that a detrimental result thereof is that the lean and fat begin to separate too early in the process, thereby making more difficult separation at subsequent stations. Also, excessive comminuting can be accompanied by some evidence of denaturing of protein.

As stated, raw fat-containing material passing through the particle size reduction station 11 will be raised in temperature as a result of the grinding operation. Typically, the temperature rise will need to be adjusted at the temperature adjustment station 12. A feeder pump apparatus 22 directs the supply of comminuted meat to a heat exchanger assembly 23. Preferably, the heat exchanger assembly raises the temperature of the flow of comminuted meat so that the temperature of substantially the entire flow of meat therethrough is between about 100° and about 115° F. It is important that the temperature be closely controlled and that this temperature be controlled for all of the meat passing through the temperature adjustment station 12. Preferably, the temperature adjustment station 12 should maintain the desired temperature to such an extent that it is possible to maintain a target temperature within the specified range of ±1.5° F. for virtually all of the comminuted meat flowing through the heat exchanger assembly 23. Generally, the processing residence time within heat exchanger assembly 23 will be for less than 10 minutes, preferably less than 5 minutes.

It has been found that this objective of maintaining close temperature tolerances can be achieved when the heat exchanger assembly 23 includes one or more swept or scraped surface heat exchangers or wiped film heat exchangers. Suitable scraped surface heat exchangers in this regard include those of a AMCA International, such as the Cherry-Burrell Model No. 672L heat exchanger. Temperature adjustment station 12 preferably also includes a flow meter 24 and a temperature sensor 25, as well as a recirculation conduit (not shown) and an outflow conduit 26. In the event that the sensor determines the temperature of the meat exiting the heat exchanger assembly 23 is not within the designated tolerances, the meat flow will be recirculated and passed again through the heat exchanger assembly 23.

The illustrated heat exchanger assembly is of the water-jacketed type whereby water of the proper temperature flows through Jackets, the outer surfaces of which are in contact with the comminuted meat flowing therethrough, which surfaces are scraped in a manner well-known in the art. The water jacketing arrangement includes a steam supply unit, generally designated as 27, a water reservoir 28, centrifugal pumps 29, flow control valves 31 and recirculation channels 32.

Heated comminuted meat flows out of an exit conduit 33 of the temperature adjustment station. At this stage, the comminuted meat temperature of all of the meat flowing through the exit conduit 33 is at a temperature as low as about 90° F. and lower than 120° F., preferably between about 100° and about 115° F. It has been found that, with most comminuted meat, if the temperature is raised to 120° F., a substantial quantity of the protein therein becomes denatured and loses its natural raw functionality. Similarly, the denaturation process typically is initiated at temperatures equal to or greater than about 115° F. if the comminuted meat is subjected to temperatures in this range for as short a time period as five seconds. It has been found that the desired degree of controlled, continuous heating is achieved according to the invention by using a scraped surface heat exchanger which controls the temperature of comminuted meat flowing therethrough within a range of ±1.5° F. By this procedure, protein and fat overheating is avoided while providing the needed feed temperature into the centrifugation system 13.

Centrifugation system 13 receives the heated flow of comminuted meat. Preferably, the exit conduit 33 joins with a receiver 34 having a positive displacement pump 35 and a flow meter 36 into a continuous decanter centrifuge assembly 37. Assembly 37 decants a fat portion off of a protein portion by relative rotation so as to impart gravitational forces, or G-forces on the heated comminuted meat to accomplish the decanting function. The heated, comminuted meat enters tube 38 and is flung therefrom through a plurality of exit holes 39 and to an auger assembly 41. Revolutions per minute of the continuous decanter centrifuge 37 are measured by a tachometer 42, and the G-force is calculated from the revolutions per minute readings. The fat component has a liquid consistency, and it exits the continuous decanter centrifuge 37 through openings 43. An angled dam 44 is provided at an opposite end of the centrifuge 37, and the auger assembly 41 augers the generally solid meat or protein component toward and along the angled dam 44 and out of the centrifuge 37. The substantially liquid fat component cannot be augered up the angled dam 44 and thus exits through the openings 43. Accordingly, the liquid fat component flows through outlet 45, while the meat or protein component flows through the outlet 46. The material flowing through the outlet 45 is a fat byproduct which may be further processed or discarded as desired. Flow through the outlet 46 provides the reduced fat meat product prepared in accordance with the invention.

Generally speaking, it is important that the G-force imparted by the decanter centrifuge assembly 37 be adequate to achieve the needed separation for the particular comminuted meat at the temperature of feed into the decanter centrifuge. Forces applied will typically be not greater than 5,000 G's, which is currently a typical limit of available centrifuge equipment. Usually, at least about 2400 G's need to be applied in order to achieve the advantageous results of the present invention. A preferred range is between about 2700 and about 3500 G's, an especially preferred range being between about 3000 and about 3300 G's. Decanter centrifuges are available from Alfa-Laval and from Sharples and from other companies. Parameters for these types of devices include residence time for the meat within the centrifuge, differential speed, which is the difference between the speeds of the hollow cylinder 38 and of the auger 41, as well as the height of dam 44, G-force of the bowl, and flow rate into the centrifuge.

Typically, the temperature of the reduced fat meat flowing from the outlet 46 will be lowered promptly for reasons well known in the art in order to avoid any risk of developing microbiologically undesirable conditions in the meat or of denaturing the meat protein. A suitable means for achieving the necessary cooling is the chilling station 14 illustrated in FIG. 4. A suitable receiver 47 and positive displacement pump 48 transport the flow of meat from the outlet 46 into a cooling heat exchanger assembly 49, which is preferably a scraped surface heat exchanger system as described herein in connection with the temperature adjustment station 12, except instead of using heated water, the cooling heat exchange assembly 49 cools using liquid ammonia or the like. The reduced fat meat flowing from outlet conduit 51 has a temperature of about 40° F. or less. It is important to note that, with the present process and apparatus, the reduced fat meat product is not frozen, thereby avoiding a procedure which can damage meat fibers. Usually, the time product is within the cooling assembly 49 will be not greater than ten minutes.

With further reference to the chilling station 14, this station could be eliminated in those instances where the reduced fat meat is directly fed into a meat manufacturing operation. For example, the still warm reduced fat meat could be fed directly to a wiener-making line for combining with other ingredients and shaping into wieners or the like. This is possible, of course, only if processing conditions are such that there are no microbiological concerns or risks.

It will be appreciated that the entire apparatus and process illustrated is one that can be run continuously and on an in-line basis. The apparatus and process are advantageously amenable to automated monitoring and controlling so as to achieve strict processing parameters. Especially important parameters in this regard are the following: conditions of particle reduction including the resultant particle size of the comminuted meat; temperature of the comminuted meat being fed into the decanter centrifuge; and the G-force imparted by the decanter centrifuge. It is typically important that the comminuting device itself initiate the temperature rise of the fat-containing raw meat trimmings, a temperature rise of at least about 20° F. being minimal for a fat-containing meat supply which is initially at a temperature of on the order of about 40° F. It is typically desirable that this temperature rise result in a meat temperature that is well below the needed feed temperature into the decanter centrifuge, due at least in part to the fact that the temperature adjustment station 12 provides temperature control capabilities which are far superior to what can be imparted by a comminution unit. In addition, if a comminution unit effects a temperature rise of from about 80° F. to about 120° F. or above, this signifies that relatively harsh grinding conditions were imparted to the raw fat-containing meat, thereby increasing the likelihood that damage to the meat will have occurred within the comminution unit. It is typically acceptable for the temperature rise imparted by the comminution unit to be between about 20° and about 80° F.

It will be appreciated that the yield of reduced fat meat which can be expected according to this process will vary depending upon the fat-containing starting material. It has been found that, according to the present process, if a reduced fat meat having a fat percentage of on the order of 5% is desired, a target yield of 38% is possible when the fat-containing meat is 42 pork. A target yield of 73% can be expected when the fat-containing material is 72 pork. A target yield of 45% can be expected when the fat-containing meat is 50 beef, and a target yield of 82% can be expected when the fat-containing material is mechanically deboned turkey having a fat percentage on the order of about 20%. For example, it is possible to convert one hundred pounds of 42 pork trimmings in order to provide about 40 pounds of reduced fat pork having a fat percentage on the order of about 5%.

In addition to being able to provide reduced fat meats having exceptionally low fat contents, the present apparatus and process provide this reduced fat meat with a functionality that is virtually indistinguishable from that of unprocessed raw meat. The functionality is such that the reduced fat meat is readily combined with customary diluents such as water, gums, phosphates, or other binders and the like. Exemplary gums include carrageenan, elgin, pectin, and guar gum. The non-meat proteins include hydrolyzed vegetable protein, milk protein hydrolysate, beef broth, wheat gluten, gelatin, isolate soy protein, whey protein concentrate and egg albumin. Included in suitable starches are potato starch, modified food starch, precooked rice flour, vegetable starch, pea fiber, corn starch and pea starch. Sodium phosphate and sodium tripolyphosphate are examples of typical phosphates. Other binders include oat fiber, rice dextrin, polydextrose, methylcellulose, Simpless (registered trademark) and Trailblazer (registered trademark).

Generally speaking, functionality is calculated by dividing the gross water holding capacity by the percentage of protein in the reduced fat meat. It is generally believed that the present invention increases the gross water holding capacity of the meat processed according to the invention. This enhanced gross water holding capacity is believed to be an important indicator of the excellent functionality of the reduced fat meat. The present invention allows reduction of the fat percentage of high fat trimmings below about ten percent and down to on the order of about five weight percent while maintaining the following functionality parameters: a protein level of greater than 20%, a functionality in excess of 3, and a hydroxyproline value below about 11 mg/g, preferably less than 6 mg/g.

With more particular reference to the water holding capacity, excess or gross water binding is a measure of the extra swelling capacity for meat prior to cooking and is thereby a measure of the quantity and/or quality of functional protein. This gross water holding capacity is calculated by a procedure whereby the percent cookout is determined and is used as a measure of meat quality with respect to cooking when proteins are maximally hydrated. Regarding the hydroxyproline analysis of meat, this is an amino acid found in collagenous protein, but not in contractile protein. Thus, by quantitatively determining the hydroxyproline levels in meat products, the collagen content of the sample is measured. The present invention consistently provides a hydroxyproline value of less than 11 mg/g, in many cases below 6 mg/g.

With further reference to the fat-containing starting materials, 42 pork is known as regular pork trim, and it will include about 58% fat, about 8% protein and about 34% moisture. 72 pork trim typically includes about 28% fat, about 15% protein and about 57% moisture. The reduced fat pork prepared according to the present invention will have on the order of about 5% fat, 21% protein and 74% moisture, while the fat residue or byproduct contains about 84% fat, 1.5% protein, and 14.5% moisture. Reduced fat pork of this type can be used, for example, to make a low-fat sausage without requiring any hand trimming, with the sausage made according to the invention being even lower in fat than that possible by traditional hand trimming procedures. The present invention makes it possible to consistently provide, when necessary through the addition of water, spices and diluents, a sausage such as a wiener which has a fat content of only 5%.

When it comes to meat other than pork, fat removal tends to be a somewhat easier proposition. For example, the present invention can transform 50 beef into reduced fat beef having about 3% or less fat content, based upon the weight of the reduced fat beef. Turkey originally having from 20 to 30% fat can be reduced by the present invention to a reduced fat turkey or the like having a fat content of between about 2 and 3% or lower, based on the weight of the reduced fat turkey.

The reduced fat meat produced according to the invention has the appearance of a relatively dry, finely ground pork. It has the appearance of finely chopped muscle, is very cohesive, and readily binds to itself. Reduced fat turkey made according to the invention is similar in appearance and properties.

The unformulated raw reduced fat meat prepared according to the invention is useful in preparing finished products suitable for cooking and consumption. The result is an edible product having taste and other qualities of finished products having meat raw materials with fat contents far in excess of the reduced fat meats according to the present invention.

Reduced fat meat according to the process can be formed into meatballs, "hamburger" patties, pork "tenderloin", "veal" cutlets and formed meat cups, either with or without mixing with suitable diluents, especially water. An exemplary nutritional analysis for a beef hamburger patty made from a reduced fat beef is as follows. A four ounce cooked hamburger patty made from traditional beef sources having a 28% fat content has a total of about 300 calories. A low-fat cooked hamburger patty made from hand trimmed beef and which is currently marketed as an especially lean hamburger is at a 9% fat level (diluents being included), containing 8 grams of fat and having between about 70 and 100 calories. A four ounce cooked hamburger patty made from reduced fat beef provided according to the present invention has a fat content of about 4% (diluents being included), has 3.6 grams of fat and 36 calories are provided by the fat within the hamburger patty.

Reduced fat meat according to the invention provides products such as wieners and bologna which are 97% fat free and wherein less than 30% of the calories within the meat product originate from fat. The products thus produced are similar in appearance, texture, flavor, mouthfeel, handling attributes, processing and preparation characteristics and storage stability to traditionally used meat raw materials.

For example, a regular 1.6 ounce commercial hot dog has 150 calories, is 70% fat free, has 13 grams of fat, and 81% of the calories are from fat. A 1.6 ounce hot dog prepared according to the invention has 45 calories, is 97% fat free, has 1 gram of fat, and 30% of its calories originate from the fat. As another example, a 1-ounce serving of regular commercial bologna has 90 calories, is 70% fat free, has 6 grams of fat, and 85% of the calories originate from the fat. A 1-ounce serving of bologna prepared from the present reduced-fat meat has 30 calories, is 97% fat free, has less than 1 gram of fat, and 30% of its calories originate from the fat.

In addition to sausage-type products such as wieners and bologna, other products can be made. Included are pork sandwiches, taco meat, meatballs, stir-fry products, pork medallions, meat pieces, meat strips, cutlets, chops, roasts, crumbles, patties, sliced pork roast for sandwiches, meat snack products, stuffing rolls, pork cups, sausage cups, and the like. Methods of production include cooking in casing, extruding, co-extruding, encrusting, forming, such as into bacon-appearing products, using swirl technology, using Surimi technology and the like.

The following examples illustrate the process and apparatus according to the present invention.

EXAMPLE 1

Batches of about 400 pounds of ground (⅛ inch grind) "50 beef," each having approximately 50 percent fat and approximately 50 percent lean and at a temperature of 40° F., were processed through a Cozzini grinding apparatus having a ten-inch passageway and having a three-bladed knife pressure fitted and rotatable with respect to a foraminous plate with 4.5 mm orifices. The meat was comminuted, during which it was raised to a temperature of 75° F. Each sample was then passed through a wiped film heat exchanger to elevate its temperature to a selected feed temperature. When at that feed temperature, each sample was processed through a decanter centrifuge apparatus (Alfa-Laval NX-309S31G) during which a centrifugal force of 3180 G's was imparted to the meat, the feed rate being at approximately 14 pounds per minute, and the meat portions and fat portions were analyzed for moisture, protein and fat content. The results were as follows:

| Batch No. | Feed Temp. | Yield | Reduced Fat Meat | | | Fat By-Product |
|---|---|---|---|---|---|---|
| | | | Moist | Prot. | Fat | Prot. |
| 1 | 98° F. | 51.3% | 70.6% | 21.4% | 8.7% | 2.1% |
| 2 | 95° F. | 47.2% | 70.3% | 22.1% | 7.4% | 1.9% |
| 3 | 95° F. | 46.5% | 69.8% | 21.3% | 8.0% | 2.2% |
| 4 | 110° F. | 49.7% | 74.0% | 24.5% | 1.5% | 0.5% |
| 5 | 110° F. | — | 76.1% | 22.7% | 1.1% | 0.8% |
| 6 | 110° F. | 50.0% | 74.8% | 24.1% | 1.0% | 1.1% |

It will be noted that the percent of fat present in the reduced fat meat portion is lower at the higher feed temperature when compared with the runs at the somewhat lower feed temperature.

EXAMPLE 2

A continuous run of ⅛ inch ground "42 pork" at an initial temperature of 40° F. and containing about 59 percent fat was comminuted through the Cozzini grinder used in Example 1, the exit temperature being 70° F. A wiped surface heat exchanger raised the pork to a feed temperature of 109° F. into the decanter centrifuge of Example 1, the feed rate being either 15.3 or 15.1 pounds per minute, and the G-force being 3180 G's. With the differential speed of the centrifuge set at 26 rpm, the following data were collected:

| | Reduced Fat Meat | | | Fat Byproduct |
|---|---|---|---|---|
| Yield | Moist | Prot. | Fat | Prot. |
| 42.2% | 73.4% | 20.4% | 5.6% | 0.3% |
| 42.2 | 74.0 | 20.4 | 5.8 | 0.3 |

With the differential speed of the centrifuge set at 19 rpm, the residence time within the decanter centrifuge was greater than in the run reported immediately above, and the following data were collected:

| | Reduced Fat Meat | | | Fat Byproduct |
|---|---|---|---|---|
| Yield | Moist | Prot. | Fat | Prot. |
| 33.3% | 75.3% | 22.2% | 2.1% | 3.4% |
| 26.5 | 75.7 | 21.8 | 2.9 | 4.7 |
| 34.4 | 74.9 | 22.8 | 2.3 | 3.8 |

Continuous runs starting with ground "42 pork" which was at a temperature of 47° F., and analyzed as containing from about 53.5 to 55.5 percent fat were comminuted through the Cozzini grinding apparatus, the exit temperature being 104° F. Each run was passed through a wiped surface heat exchanger to provide a feed temperature of about 108° F. for processing through the decanter centrifuge apparatus of Example 1, the feed rate averaging about 14.4 pounds per minute, with the following results:

| G-Force | Yield | Reduced Fat Meat | | | Fat By-product |
| | | Moist | Prot. | Fat | Prot. |
| --- | --- | --- | --- | --- | --- |
| 2260 | 42.4% | 71.8% | 18.9% | 9.9% | 0.7% |
| 2260 | — | 72.6% | 18.7% | 8.6% | 0.4% |
| 2260 | 42.7% | 72.6% | 18.2% | 9.3% | 1.4% |
| 2260 | 41.6% | 72.9% | 19.0% | 7.6% | 1.3% |
| 2686 | 35.2% | 73.3% | 21.6% | 5.5% | 2.6% |
| 2686 | 37.5% | 73.9% | 20.5% | 4.0% | 4.9% |
| 2686 | — | 73.8% | 23.5% | 2.8% | 4.6% |

The percent of fat found in the reduced fat meat was lower at the higher of the two G-forces applied to these samples.

Two samples of ground "42 pork" weighing about 400 pounds each and analyzed as containing 60.1 and 57.3 percent fat, respectively, and having an uncomminuted grind size of 5/64 inch were heated in a tank and fed into a Sharples P-3400 decanter centrifuge apparatus at a feed rate of 22 pounds per minute and under a differential speed of 17.2 and 12 rpm, respectively, the G-force being 3020 G's, with the result that the percent fat in the reduced fat meat was significantly higher than in the runs including comminuting reported above in this Example.

| Feed Temp. | Yield | Reduced Fat Meat | | | Fat By-Product |
| | | Moist | Prot. | Fat | Prot. |
| --- | --- | --- | --- | --- | --- |
| 109° F. | 41.7% | 61.1% | 21.0% | 18.7% | 0.3% |
| 100° F. | 42.8% | 63.0% | 18.8% | 18.1% | 1.6% |

EXAMPLE 3

A continuous run of ground "72 pork" having an average of 30.8% fat, 54.6% moisture and 15.1% protein and a temperature of about 49.6° F. was fed through a Cozzini grinding apparatus operating at 2400 rpm to provide an especially fine grind. The comminute thus formed was at a temperature of 117° F., after which it was passed through a scraped surface heat exchanger to adjust the feed temperature to 110° F. This flow of meat was next processed within the decanter centrifuge of Example 1 at a 15.5 pounds per minute feed rate, a differential speed of 37 rpm and a G-force of 3180 G's. The following data were collected when measurements were made at different times through the continuous run, the yield having been determined three times and the percentage breakdowns two times.

| Yield | Reduced Fat Meat | | | Fat Byproduct |
| | Moist | Prot. | Fat | Prot. |
| --- | --- | --- | --- | --- |
| 74.0% | | | | |
| 72.9% | 72.8% | 20.0% | 5.6% | 0.2% |
| 64.3% | 71.3% | 20.1% | 7.8% | 3.0% |

Another continuous run of this ground "72 pork" was carried out under similar conditions, except the Cozzini grinder was operating at 1200 rpm and the feed into the Cozzini grinder was at 44° F., resulting in a less fine grind and a lower temperature rise, to 70° F. The heat exchanger then adjusted the temperature to 90° F. The same decanter centrifuge conditions were used for separation, and the following measurements were recorded during this continuous run which indicate the lower feed temperature results in higher fat percentages than the data reported immediately above and immediately below:

| Yield | Reduced Fat Meat | | | Fat Byproduct |
| | Moist | Prot. | Fat | Prot. |
| --- | --- | --- | --- | --- |
| 78.4 | 69.1% | 18.9% | 11.8% | 0.3% |
| 78.9 | 69.4% | 18.9% | 11.8% | 0.4% |

A further continuous run of the 44° F. ground "72 pork" was fed to the Cozzini grinder operating at 1200 rpm. Again the temperature rise was to 70° F. In this instance, however, the heat exchanger adjusted the feed temperature to 108° F. The same decanter centrifuge conditions were used, and the following measurements were recorded during this continuous run:

| Yield | Reduced Fat Meat | | | Fat Byproduct |
| | Moist | Prot. | Fat | Prot. |
| --- | --- | --- | --- | --- |
| 75.3 | | | | |
| 74.2 | 72.4% | 19.9% | 7.2% | 3.1% |
| 71.6 | 72.6% | 20.8% | 7.1% | 0 |

EXAMPLE 4

A continuous run of ground "42 pork" was comminuted through the Cozzini grinder of Example 1, the exit temperature being 65° F. The resulting comminuted pork was passed through a swept surface heat exchanger, its temperature being raised to and maintained between 104° and 106° F. At this temperature, the flow of pork was fed into a decanter centrifuge as described in Example 1 providing a G-force of 2690, the differential speed being 18 rpm and the feed rate being between 13.7 and 15.7 pounds per minute. Yields of reduced fat meat were between 27.7% and 40% of the ground "42 pork," and the reduced fat meat analyzed as containing 72.8–74.8% moisture, 18.8–19.2% protein and 4.7–7.7% fat. The reduced fat meat had a very red coloration as indicated by a Minolta chromameter, the coloration being substantially that of freshly ground pork. The functionality of the reduced fat meat was excellent, the water holding capacity being 94.3–100.4% pounds of water per pound of meat and the protein percentage being 18.8–19.2%, the functionality ratio of percent held water to percent protein being 4.9:1 to 5.3:1.

EXAMPLE 5

Sixteen runs of ground "42 pork" were comminuted through the Cozzini grinder of Example 1, the particle sizes out of the grinder being measured at 0.1 to 0.6 mm in length and 0.06 and 0.1 mm in diameter. Each comminuted run then flowed through the wiped heat exchanger to adjust its temperature prior to further processing in a centrifuge. Each comminuted run then flowed through the wiped heat exchanger to adjust its temperature prior to further processing in a centrifuge. Data regarding these aspects of the runs were as follows.

| Run | Fat (%) | Infeed Temp. (°F.) | Grinder RPM | Outfeed Temp.(°F.) | Temp. Into Centrifuge (°F.) |
|---|---|---|---|---|---|
| 1 | 54.2 | 47.1 | 1200 | 70.8 | 110.9 |
| 2 | 54.2 | 47.1 | 1200 | 73.3 | 101.4 |
| 3 | 54.0 | 50.4 | 1200 | 88.1 | 100.9 |
| 4 | 53.4 | 47.3 | 2000 | 100.1 | 114.9 |
| 5 | 56.7 | 48.1 | 2000 | 87.6 | 105.3 |
| 6 | 57.6 | 47.1 | 2000 | 86.1 | 110.9 |
| 7 | 57.8 | 46.9 | 1200 | 68.1 | 101.9 |
| 8 | 58.2 | 47.1 | 1200 | 69.1 | 109.6 |
| 9 | 56.7 | 48.1 | 2000 | 109.8 | 113.8 |
| 10 | 54.9 | 48.1 | 2000 | 85.7 | 101.4 |
| 11 | 58.8 | 48.1 | 1200 | 70.3 | 112.1 |
| 12 | 59.7 | 47.9 | 1200 | 74.7 | 102.6 |
| 13 | 59.2 | 50.2 | 1200 | 72.3 | 103.3 |
| 14 | 57.7 | 52.0 | 1200 | 76 | 109.8 |
| 15 | 56.3 | 52.8 | 2000 | 89.3 | 112 |
| 16 | 56.9 | 51.2 | 2000 | 112.5 | 104.8 |

Each comminuted and heated run was then continuously fed into the decanter centrifuge as described in Example 1, set to provide a gravitational force of 3180 G's. Data in this regard were as follows, the feed rate being generally the same both into the grinder and into the centrifuge.

| Run | Infeed Rate (lbs/min) | Differential Speed (RPM) | Yield (%) |
|---|---|---|---|
| 1 | 57.8 | 12.1 | 34.8 |
| 2 | 35.8 | 12.1 | 43.8 |
| 3 | 53.1 | 26.6 | 53.9 |
| 4 | 35.8 | 26.6 | 46.9 |
| 5 | 36.5 | 12.1 | 34.4 |
| 6 | 56.1 | 12.1 | 33.2 |
| 7 | 55.8 | 26.1 | 41.7 |
| 8 | 35.7 | 26.6 | 43.3 |
| 9 | 36.4 | 12.1 | 31.6 |
| 10 | 53.0 | 12.1 | 35.3 |
| 11 | 53.9 | 26.6 | 33.8 |
| 12 | 33.8 | 26.6 | 42.9 |
| 13 | 50.8 | 12.1 | 38.4 |
| 14 | 33.3 | 12.1 | 41.1 |
| 15 | 50.4 | 26.6 | — |
| 16 | 31.3 | 26.6 | 32.8 |

Regarding the infeed rate, a nominal infeed rate of 35 pounds per minute resulted in the feed material being present within the centrifuge 2.85 minutes, which generally indicates the length of time the G-forces acted on the feed material. For the nominal 55 pounds per minute infeed rate, the material remained under the G-forces for 1.8 minutes. The resulting reduced fat pork was analyzed as follows, the Color L-values reported being from a Minolta chromameter and being generally indicative of color associated with fresh pork.

| Run | Moist (%) | Prot. (%) | Fat(%) | Function-ality | Color (L-value) |
|---|---|---|---|---|---|
| 1 | 71.47 | 18.47 | 11.07 | 6.04 | 55.37 |
| 2 | 73.50 | 18.57 | 7.60 | 6.68 | 54.92 |
| 3 | 72.17 | 18.00 | 9.60 | 6.62 | 57.71 |
| 4 | 75.17 | 20.30 | 3.90 | 5.60 | 53.50 |
| 5 | 74.77 | 21.33 | 2.93 | 6.12 | 57.85 |
| 6 | 72.90 | 24.10 | 3.23 | 6.97 | 57.90 |
| 7 | 72.90 | 18.43 | 7.90 | 5.94 | 60.21 |
| 8 | 73.80 | 19.55 | 8.10 | 5.16 | 58.69 |
| 9 | 72.50 | 23.60 | 2.60 | 6.54 | 55.55 |
| 10 | 74.30 | 19.40 | 5.20 | 7.58 | 57.32 |
| 11 | 71.25 | 18.05 | 9.30 | 5.15 | 59.38 |
| 12 | 72.13 | 17.27 | 9.10 | 5.49 | 61.08 |
| 13 | 71.00 | 18.00 | 10.23 | 5.86 | 60.68 |
| 14 | 73.00 | 17.20 | 7.70 | 6.83 | 58.04 |
| 15 | 74.70 | 20.80 | 2.90 | 5.41 | 55.81 |
| 16 | 76.50 | 20.40 | 1.90 | 5.38 | 55.88 |

The fat byproduct or liquid phase coming off of the centrifuge analyzed as follows:

| Run | Moist (%) | Prot. (%) | Fat (%) |
|---|---|---|---|
| 1 | 6.30 | 1.20 | 94.00 |
| 2 | 5.30 | 0.90 | 94.40 |
| 3 | 0.80 | 0.40 | 98.40 |
| 4 | 2.30 | 0.50 | 98.20 |
| 5 | 9.43 | 1.30 | 89.93 |
| 6 | 17.77 | 2.10 | 81.17 |
| 7 | 1.93 | 0.23 | 97.60 |
| 8 | 0.85 | 0.10 | 99.20 |
| 9 | 14.30 | 1.60 | 85.70 |
| 10 | 7.00 | 1.40 | 92.90 |
| 11 | 7.10 | 1.60 | 93.25 |
| 12 | 0.90 | 0.20 | 95.73 |
| 13 | 6.70 | 0.70 | 91.50 |
| 14 | 1.60 | 0.20 | 97.80 |
| 15 | 4.80 | 0.70 | 89.40 |
| 16 | 8.10 | 0.40 | 90.70 |

EXAMPLE 6

A continuous run of mechanically deboned turkey having a fat content of approximately 20 percent was passed into a heat exchanger which provided a feed temperature averaging 104° F. at which the warmed turkey was fed into an Alfa-Laval NX-309S316 decanter centrifuge apparatus at a feed rate averaging 13.4 pounds per minute and a differential speed of 38 rpm. The following data were recorded during this continuous run:

| Reduced Fat Meat | | |
|---|---|---|
| Moist | Prot. | Fat |
| 75.4% | 19.7% | 3.6% |
| 75.5% | 19.7% | 1.6% |
| 78.6% | 17.9% | 2.0% |
| 76.3% | 19.1% | 3.4% |
| 78.2% | 17.4% | 2.0% |

Another continuous run of mechanically deboned turkey was made as reported immediately above in this Example, this time the feed temperature averaging 97.2° F., the feed rate averaging 12.1 pounds per minute, and the differential speed being 38 rpm. The following data were recorded during this run:

| Reduced Fat Meat | | | Fat Byproduct | | |
|---|---|---|---|---|---|
| Moist | Prot. | Fat | Moist | Prot. | Fat |
| 78.9% | 17.0% | 3.1% | | | |
| 77.2 | 18.7 | 3.0 | | | |
| 78.1 | 18.3 | 2.5 | | | |
| 77.7 | 18.3 | 2.6 | | | |
| 79.4 | 17.2 | 2.5 | | | |
| 76.5 | 19.1 | 3.1 | | | |

| Reduced Fat Meat | | | Fat Byproduct | | |
|---|---|---|---|---|---|
| Moist | Prot. | Fat | Moist | Prot. | Fat |
| 76.7 | 19.1 | 2.6 | | | |
| 79.3 | 17.8 | 2.7 | | | |
| 79.2 | 17.1 | 2.0 | 24.0% | 2.4% | 71.8% |
| 77.8 | 18.1 | 2.3 | 44.0 | 4.9 | 56.1 |
| 79.3 | 17.2 | 1.5 | 42.6 | 4.1 | 55.5 |
| 78.3 | 17.9 | 1.2 | 44.7 | 4.4 | 56.6 |
| 77.7 | 18.6 | 1.9 | 50.3 | 4.9 | 47.3 |
| 77.9 | 18.3 | 1.7 | 43.4 | 4.4 | 55.2 |

A further mechanically deboned turkey run was conducted. Sampling of the flow indicated an initial fat percentage averaging about 22 percent. The feed temperature into the Alfa-Laval decanter centrifuge averaged 99.8° F., the feed rate averaged 12.6 pounds per minute, and the differential speed was 40 rpm. The data recorded were as follows:

| Reduced Fat Meat | | | Fat Byproduct | | |
|---|---|---|---|---|---|
| Moist | Prot. | Fat | Moist | Prot. | Fat |
| 79.0% | 17.8% | 1.9% | — | 3.9% | — |
| 77.1 | 17.0 | 4.9 | — | — | — |
| 78.2 | 17.0 | 2.4 | — | 2.9 | — |
| 78.7 | 17.4 | 2.1 | — | — | — |
| 76.7 | 16.8 | 5.5 | — | 2.9 | — |
| 76.6 | 17.6 | 5.0 | — | — | — |
| 79.1 | 16.7 | 1.9 | — | 3.5 | — |
| 78.6 | 16.8 | 3.8 | — | — | — |
| 79.3 | 17.6 | 2.8 | — | 2.7 | — |
| 79.0 | 17.7 | 2.4 | — | — | — |
| 76.5 | 16.9 | 5.1 | 16.7% | 2.4 | 81.2% |
| 78.1 | 16.8 | 3.0 | 19.0 | 2.9 | 77.3 |
| 78.4 | 18.0 | 1.9 | | | |
| 78.8 | 16.8 | 1.3 | | | |
| 73.7 | 19.6 | 2.6 | | | |
| 72.7 | 22.7 | 3.7 | | | |
| 71.8 | 22.6 | 3.5 | | | |
| 72.5 | 22.4 | 4.4 | | | |

Another continuous run of mechanically deboned turkey was conducted as described in this Example. The feed temperature was maintained at approximately 100° F., the feed rate was 14 pounds per minute, the differential speed was 38 rpm, and the G-force was 3180 G's. The data recorded were as follows:

| Reduced Fat Meat | | |
|---|---|---|
| Moist | Prot. | Fat |
| 76.9% | 16.8% | 4.5% |
| 78.0 | 16.7 | 2.7 |
| 78.3 | 17.6 | 3.0 |
| 77.8 | 17.0 | 3.9 |
| 78.2 | 16.8 | 2.6 |
| 77.6 | 17.2 | 2.4 |
| 78.1 | 17.2 | 3.2 |
| 78.3 | 16.9 | 3.8 |
| 78.7 | 16.8 | 3.3 |
| 77.0 | 16.7 | 4.8 |
| 78.7 | 17.0 | 3.0 |
| 78.7 | 17.7 | 2.3 |
| 78.1 | 18.0 | 2.2 |
| 78.4 | 17.9 | 1.9 |
| 78.6 | 17.3 | 2.8 |
| 77.5 | 17.8 | 3.7 |

EXAMPLE 7

Runs of mechanically deboned turkey were made at two different temperatures of feed into an Alfa-Laval NX-309S316 decanter centrifuge run at a feed rate on the order of 17 pounds per minute, at differential speeds of 20, 30 or 40 rpm, and at a G-force of 3180 G's. When the feed temperature was 76° F., the following data were collected:

| Reduced Fat Meat | | | Fat Byproduct |
|---|---|---|---|
| Moist | Prot. | Fat | Prot. |
| 71.8% | 15.9% | 11.4% | 1.8% |
| 71.3 | 15.7 | 11.4 | 0.7 |
| 70.3 | 15.7 | 12.2 | 5.9 |
| 69.8 | 15.4 | 13.6 | 5.5 |

When the feed temperature was 100° F., the following data were collected:

| Reduced Fat Meat | | | Fat Byproduct |
|---|---|---|---|
| Moist | Prot. | Fat | Prot. |
| 78% | 18.4% | 1.2% | 4.6% |
| 77.3 | 16.1 | 3.2 | 4.0 |
| 73.3 | 19.3 | 4.9 | 5.1 |
| 72.9 | 19.0 | 5.1 | 5.2 |
| 73.4 | 19.6 | 5.8 | 5.0 |
| 74.0 | 19.7 | 5.5 | 4.8 |

EXAMPLE 8

Functionality tests were performed on various meat products. The functionality ratios of percent of gross water binding divided by percent protein were reported as follows: 3.6 for 80% lean mechanically deboned turkey, 4.8 for 85% lean beef, 2.8 for 42% lean pork, 4.2 for 95% lean fat reduced pork, processed generally in accordance with Example 4 hereof. By following a procedure believed to be substantially in accordance with U.S. Pat. No. 3,177,080, a functionality ratio of 1.1 was obtained.

EXAMPLE 9

Hot dogs were made with reduced fat pork processed from "42 pork" generally in accordance with Example 4. The fat reduced meat was mixed in a paddle or ribbon mixer with sodium nitrite, sodium erythorbate, salt and sodium phosphate. One quarter of the water needed for the hot dog formulation was added to the running mixer, and mixing proceeded for 10 minutes at a temperature of 30°–35° F. Milk protein hydrolysate was added, followed by one-half of the remaining water needed for the formulation while mixing continued. The remaining water was then added with rice gel, pregelled rice flour, corn syrup, dextrose, liquid smoke and liquid spice, and mixing continued for an additional 10 minutes at a temperature of 35°–40° F. The total mix time within the paddle or ribbon mixer was 25 minutes. This fat reduced pork product was then vacuum chopped to a temperature of 65°–70° F. and stuffed into cellulose casings. Each hot dog was heat processed to a temperature of 155°–165° F., followed by chilling to below 40° F. The cellulose casings were peeled from the hot dogs and vacuum packaged.

Nutritional information on hot dogs produced in this manner was as follows: 74.9% moisture, 13.2% protein, 97.0% fat free, 3.0 grams of fat per hundred grams of hot dog, 2.2% salt, 99 calories per hundred grams of hot dog, and 27% calories from fat.

The hot dogs were also subjected to physical testing using torsional or twisting test procedures substantially in accordance with stress and strain measurement techniques for sausage products. Details of these techniques are found in Hamann, D. D., et al, "Instrumental Texture Measurements for Processed Meat Products," *J. American Meat Science Association, Reciprocal Meat Conference Proceedings*, Volume 40, 1987; and Hamann, D. D., "Rheology as a Means of Evaluating Functionality in Processed Muscle Foods," presented at IFT 1987 Annual Meeting, Las Vegas, Nev.; as well as additional articles and data referred to therein. The measured stress was between 25,000 and 27,000 pascals. This stress is a general indicator of the hardness or softness of the hot dog. A general range for acceptable commercially manufactured hot dogs is about 10,000 to about 50,000 pascals, preferably between about 15,000 and about 40,000 pascals. The measured strain was 1.4–1.6, a dimensionless indicator of elasticity, rubberyness or brittleness, these strain values generally quantifying the amount of twist the hot dogs can sustain. A general range of acceptable strain for commercially manufactured hot dogs is between about 1.15 and about 1.95, preferably between about 1.2 and about 1.7.

The hot dogs were subjected to further test procedures based on a Malcom Bourne instrumental analysis testing scheme wherein a sample is compressed axially while standing on its end. Further specifics are presented in Bourne, M. C., "Textile Profile Analysis," *Food Technology*, May, 1978. The point of skin breakage or rupture, or FF value, was 11.0 to 12.5 pounds. Continued compression to 25% of original height, or F1 value, was 7.0 to 8.5, and the percent deformation at the point of rupture was 55.0–57.0%. These values likewise are typical for acceptable commercially manufactured hot dogs.

EXAMPLE 10

Bologna was prepared from fat reduced pork prepared in accordance with the invention which originated from "42 pork." One-quarter of the water needed for the bologna formulation was added thereto, and mixing proceeded in a paddle or ribbon mixer for from 1 to 2 minutes. Sodium nitrite, milk protein hydrolysate, salt and sodium phosphate were added, and mixing continued for an additional 4 to 5 minutes. All of the remaining water needed for the formulation, together with sodium erythorbate, starch, corn syrup, dextrose and liquid spice were added, and mixing proceeded for an additional 5 to 10 minutes at a temperature of 35°–40° F. The total mix time was approximately 25 minutes. Thereafter, the product was vacuum chopped to a temperature of 65°–70° F. and stuffed into either fibrous or "cook-in-bag" casings. The bologna was then heat processed to a temperature of 155°–165° F. and chilled to less than 40° F. The casings were removed, and the bologna was sliced.

Nutritional information for the bologna was as follows: 78.0% moisture, 13.0% protein, 97.0% fat free, 3.0 grams of fat per 100 grams of bologna, 2.2% salt, 97.5 calories per 100 grams of bologna and 28% calories from fat. Stress and strain testing was carried out in accordance with Example 9. The stress was between 23,000 and 29,000 pascals, and the strain was between 1.3–1.5. General and preferred ranges for commercially acceptable bologna are generally in accordance with those specified in Example 9 for hot dogs. A puncture probe Instron test gave a reading of 5.0–6.0, which is an acceptable value for a bologna product.

EXAMPLE 11

Low-fat hamburger patties were produced from fat-reduced beef prepared substantially in accordance with Example 1. The fat-reduced beef was mixed in a paddle or ribbon mixer together with water/ice, salt and carrageenan until thoroughly mixed, after about 2 to 3 minutes. The resulting mixture was ground to ⅛ inch grind size within a Hobart grinder. The ground product was formed into patties using a Hollymatic pattie forming machine.

It will be understood that the embodiments of the present invention which have been described are illustrative of some of the applications of the principles of the present invention. Numerous modifications may be made by those skilled in the art without departing from the true spirit and scope of the invention.

We claim:

1. A reduced fat pork meat prepared from a pork meat supply having a fat content between about 20 and about 60 percent by weight, based upon the total weight of the meat supply, the reduced fat pork meat being undenatured and undiluted by added diluents, and comprising: a protein component, a moisture component and a fat component; said fat component being not greater than about ten percent by weight, based on the total weight of the reduced fat meat; said reduced fat meat having a functionality value of at least about 3, wherein functionality value is defined as a ratio of gross water holding capacity percentage of the reduced fat meat to the percentage of protein within the reduced fat meat.

2. The reduced fat meat in accordance with claim 1, wherein the functionality value is at least about 4.

3. The reduced fat meat in accordance with claim 1, wherein the functionality value is at least about 5.

4. The reduced fat meat in accordance with claim 1, wherein the fat component comprises not more than about five percent by weight based on the total weight of the reduced fat pork.

5. The reduced fat meat in accordance with claim 4, wherein the fat component comprises not more than about three percent by weight based on the total weight of the reduced fat pork.

6. The reduced fat meat in accordance with claim 5, wherein the fat component comprises not more than about two percent by weight based upon the total weight of the reduced fat pork.

7. The reduced fat meat of claim 1, comprising a food product selected from the group consisting of wieners, sausages, patties, cutlets, chops, loafs, medallions, strips, roasts and rolls, said food product containing said pork meat.

8. The reduced fat meat of claim 1, comprising a wiener or a bologna that has a fat content of not more than about 3 percent by weight and wherein said wiener or bologna contains said pork meat.

9. A reduced fat meat product prepared from a supply of meat selected from the group consisting of red meat and deboned poultry, and having a fat content between about 20 and about 60 percent by weight, based upon the total weight of the meat supply, the reduced fat meat product being undenatured and undiluted by added diluents, and comprising: a protein component, a moisture component and a fat component; said fat component being not more than about three percent by weight, based on the total weight of the meat product; said reduced fat meat product having a functionality value of at least about 3, wherein functionality value is defined as a ratio of gross water holding capacity percentage of the reduced fat meat to the percentage of protein within the reduced fat meat.

10. The meat product in accordance with claim 9, comprising a food product selected from the group consisting of wieners, sausages, patties, cutlets, chops, loafs, medallions, strips, roasts and rolls, said food product containing said meat product.

11. The meat product in accordance with claim 9, wherein the meat supply is beef and the meat product is a beefburger.

12. The meat product in accordance with claim 9, comprising a wiener or a bologna which contains said meat product.

13. The reduced fat meat of claim 9, wherein said reduced fat meat is beef.

14. The reduced fat meat of claim 9, wherein said reduced fat meat is deboned turkey.

15. The meat product in accordance with claim 9, wherein the functionality value is at least about 4.

16. The meat product in accordance with claim 15, wherein the functionality value is at least about 5.

17. The meat product in accordance with claim 9, wherein the fat component comprises not more than about two percent by weight based upon the total weight of the meat product.

18. A sausage containing a reduced fat meat product prepared from a supply of meat selected from the group consisting of red meat and deboned poultry, said supply of meat having a fat content between about 20 and about 60 percent by weight, based upon the total weight of the meat supply, the reduced fat meat product being undenatured and undiluted by added diluents; the reduced fat meat product comprising a protein component, a moisture component and a fat component; said fat component being not more than about three percent by weight, based on the total weight of the reduced fat meat product; said reduced fat meat product having a functionality value of at least about 3, wherein functionality value is defined as a ratio of gross water holding capacity percentage of the reduced fat meat to the percentage of protein within the reduced fat meat; said sausage including a sausage forming ingredient mixed with said substantially undiluted reduced fat meat product subsequent to the fat reduction to form said sausage; and said sausage having a torsional stress of between about 10,000 and about 50,000 pascals, and a torsional strain of between about 1.15 and about 1.95.

19. The sausage in accordance with claim 18, wherein the sausage product has a torsional stress of between about 15,000 and about 40,000 pascals and has a torsional strain of between about 1.2 and about 1.7.

20. The sausage of claim 18, wherein the sausage is a wiener or a bologna.

21. A sausage containing a reduced fat pork meat prepared from a pork meat supply having a fat content between about 20 and about 60 percent by weight, based upon the total weight of the meat supply, the reduced fat pork meat being undenatured and undiluted by added diluents; the reduced fat pork meat comprising a protein component, a moisture component and a fat component; said fat component being not greater than about 10 percent by weight, based on the total weight of the reduced fat pork meat; said reduced fat pork meat having a functionality value of at least about 3, wherein functionality value is defined as a ratio of gross water holding capacity percentage of the reduced fat pork meat to the percentage of protein within the reduced fat meat; said sausage also including a sausage forming ingredient mixed with said substantially undiluted reduced fat pork meat subsequent to the fat reduction to form said sausage; and said sausage having a torsional stress of between about 10,000 and about 50,000 pascals, and a torsional strain of between about 1.15 and about 1.95.

22. The sausage of claim 21, wherein the torsional stress is between about 15,000 and about 40,000 pascals, and the torsional strain is between about 1.2 and about 1.7.

23. The sausage of claim 21, wherein the sausage is a wiener or a bologna.

24. A meat product having the appearance of bacon, and wherein said product comprises an undenatured reduced fat meat undiluted by added diluents, said reduced fat meat comprising a protein component, a moisture component and a fat component; said fat component being not greater than about ten percent by weight, based on the total weight of said reduced fat meat; and said reduced fat meat having a high functionality value, wherein functionality value is defined as a ratio of gross water holding capacity percentage of the reduced fat meat to the percentage of protein within the reduced fat meat.

25. The meat product of claim 24, wherein said reduced fat meat is coextruded into the product.

26. The meat product of claim 24, wherein said substantially high functionality value is at least about 3.

27. The meat product of claim 26, wherein said substantially high functionality value is at least about 4.

28. The meat product of claim 27, wherein said substantially high functionality value is at least about 5.

29. The meat product of claim 24, wherein said fat component of said reduced fat meat comprises not more than five percent by weight based on the total weight of said reduced fat meat.

30. The meat product of claim 29, wherein said fat component of said reduced fat meat comprises not more than three percent by weight based on the total weight of said reduced fat meat.

31. The meat product of claim 30, wherein said fat component of said reduced fat meat comprises not more than two percent by weight based on the total weight of said reduced fat meat.

32. The meat product of claim 24, wherein said reduced fat meat is pork meat.

33. The meat product of claim 24, wherein said reduced fat meat is a meat from the group consisting of red meat and deboned poultry.

* * * * *

UNITED STATES PATENT AND TRADEMARK OFFICE
CERTIFICATE OF CORRECTION

PATENT NO.    : 5,698,255
DATED         : December 16, 1997
INVENTOR(S)   : Roehrig, Overkamp & Morin It is certified that error appears in the above-identified patent and that said Letters Patent is hereby corrected as shown below:

Title page,
References Cited, OTHER PUBLICATIONS, line 2, change "ingredient" to -- Ingredient --.

Column 1,
Line 9-10, delete "Nos. 5,382,444,130,347 filed October 1, 1993; now U.S. Pat.

Column 4,
Line 30, change "s" to -- a --.

Column 5,
Line 39, delete "a".
Line 50, changed "Jackets" to -- jacket --.

Column 7,
Line 67, change "elgin" to -- algin --.

Column 13,
Line 56, change "Functionalitv" to -- Functionality --.

Column 14,
Line 1, change "Functionalitv" to -- Functionality --.

Column 15,
Line 28, change "17.4" to -- 17.1 --.

Signed and Sealed this

Fifth Day of February, 2002

*Attest:*

JAMES E. ROGAN
*Director of the United States Patent and Trademark Office*

*Attesting Officer*